(No Model.)
W. LE B. HAWES.
TOP PROP REST FOR VEHICLES.
No. 412,748. Patented Oct. 15, 1889.
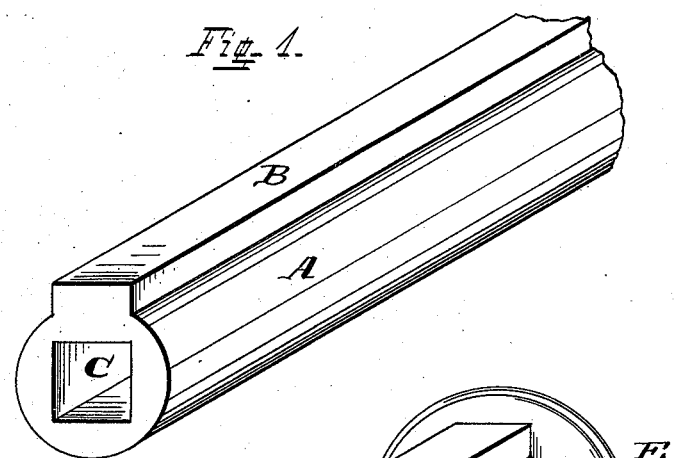
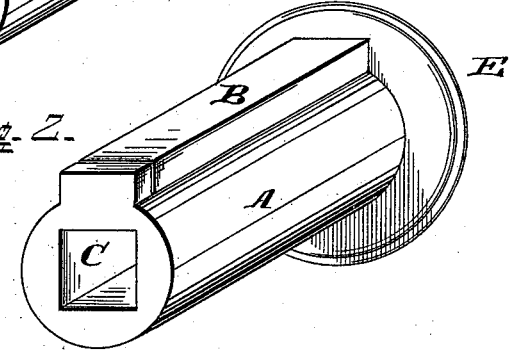
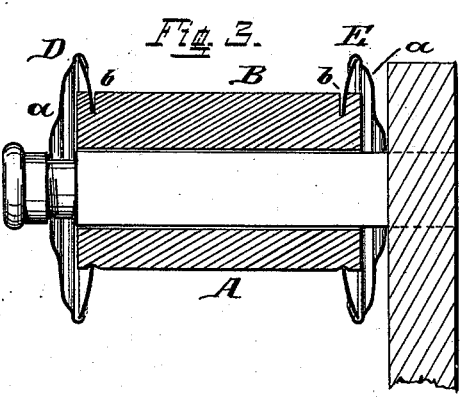
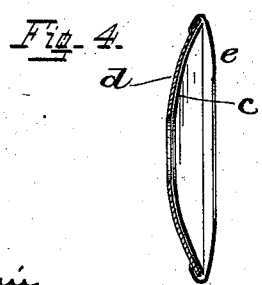
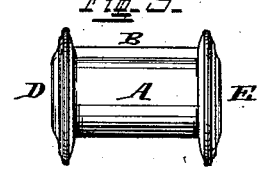

UNITED STATES PATENT OFFICE.

WILLIAM LE B. HAWES, OF CINCINNATI, OHIO.

TOP-PROP REST FOR VEHICLES.

SPECIFICATION forming part of Letters Patent No. 412,748, dated October 15, 1889.

Application filed July 25, 1889. Serial No. 318,654. (No model.)

*To all whom it may concern:*

Be it known that I, WILLIAM LE B. HAWES, a citizen of the United States, residing at Cincinnati, in the county of Hamilton and State of Ohio, have invented certain new and useful Improvements in Top-Prop Rests for Vehicles, of which the following is a full, clear, and exact description, reference being had to the accompanying drawings, forming part of this specification.

My invention relates to improvements in supports for the tops of vehicles, whereby their simplicity, durability, and cheapness are largely increased; and it consists in simplifying the parts and so uniting them that the top-prop rest as a whole becomes a single article ready for immediate use.

The object of rests of this kind is to relieve the top of the vehicle from a sudden jar or shock when the vehicle is lowered, to prevent marring of the bow-sockets, and to properly support the top while lowered. To do this it is usual to provide a cushion of rubber for the bars of the top to rest upon, or to make the entire body of the prop of rubber or of some other elastic material, and to provide washers at each end of the central support.

Many kinds of top-prop rests have been invented, with various forms of cushions and washers; but they all fail to meet the requirements of simplicity and durability.

The prop-rests are secured to the vehicles by bars or arms projecting out from the sides thereof, and are exposed to all sorts of weather and rough usage, so that it will be seen at once that an article is required that will not rust out when exposed to rain, or check and split or fall apart when subjected to the wearing influence of the weather. The props with central barrel of wood or metal and with rubber cushions are sure to rust or crack under the action of rain and sun, or the cushions and other parts soon work loose and drop out. On account of these objections it has long been customary to employ solid rubber for the block and fasten washers on each end, to be held in place, when affixed to the vehicle, by a nut at the end of the supporting-bar. Solid rubber for this purpose, cylindrical in shape, with a raised portion to act as a cushion, is now manufactured in lengths, to be cut up as desired, and washers of various kinds are furnished separately, to be held in place by a nut when the prop is affixed to the vehicle. It is extremely desirable, however, that a washer should be devised that can be easily and at the same time securely attached to the cylindrical block portion of the prop-rest, so that the two—block and washers—can be furnished together as a complete top-prop rest, as it is not an easy matter to properly cut up the solid rubber cylinders, and much annoyance and trouble would thereby be prevented, while, the washers only being held against the ends of the prop block or cylinder, the line of joining of the two is exposed and the neatness of appearance much marred thereby. It is to overcome these difficulties that my invention is directed.

In the drawings, Figure 1 shows in perspective a portion of the cylindrical solid rubber block before being cut up; Fig. 2, a perspective view of the top-prop with one washer removed; Fig. 3, a side view, partly in section, of the top-prop rest in position on the vehicle; Fig. 4, a sectional view of one of the leather-covered washers; Fig. 5, a side view of the top-prop rest before attachment to the vehicle.

Like letters of reference indicate identical parts in the different figures.

A represents the rubber cylinders, of which the central portion or block of the top-prop is formed, the upper surface of which is raised to form a cushion B. These rubber cylinders are formed also with a square hole C, running longitudinally through the same, to fit on the bar or arm secured to the vehicle, and by which the top-prop rest is supported, these bars being square in cross-section. The proper length for a top-prop is then cut off and my washers D and E fitted over the ends. These washers are hollow metallic shells, made usually in two parts $a$ and $b$, with the front shell overlapping the back shell to hold the two together. The back shells of each pair of washers have circular openings of a diameter a very little less than the diameter of the rubber-block cylinders. Slits are cut through the cushion B a short distance from each end, and the edges of the back shells of each washer being inserted therein, the washers are pressed into place, as shown in Fig. 3, and, the elastic rubber expanding behind the shells, the washers are held firmly in place without the aid of nut or other appliance. The front shell of the back washer has a square hole drilled through it to correspond with the hole in the rubber block and allow the passage of the square supporting-arm on the vehicle, while the front shell of the outside washers has a round hole at its center to receive the end of the round nut F, which is added when the top-prop is attached to the vehicle. Very often it is desired to cover the front shells of the washers with dressed leather to present a finer appearance and to prevent dents and bruises in the washer. The front metallic shells being thin, any accidental blow or knock is very apt to dent the face of the washer; but when covered with leather the metallic face is effectually guarded and the liability to become dented is removed. This leather-covered washer I make as shown in Fig. 4. The outside metallic shell c is covered with a circular shield of leather d, the same size and shape as the shell, and then the back shell e is folded over the outside edges of the two to hold them securely in place, as shown in Fig. 4. With my washers made as described I am able to make a complete top-prop rest ready for use with washers in place, and my rubber block expanding around the edges of the washers the joints between the two are completely hidden. The whole may then be japanned and is ready for use.

Having thus described my invention, what I claim, and desire to secure by Letters Patent, is—

1. As a new article of manufacture, a top-prop rest composed of a rubber cylindrical body with its ends expanded within hollow metallic washers, substantially as shown and described.

2. In a top-prop rest, the combination of hollow metallic washers with a rubber top-prop block whose ends are expanded within the back shells of said washers to hold them in place, substantially as and for the purpose described.

3. In a top-prop rest, the combination, with a top-prop block, of hollow metallic washers, the front shells of which are covered with leather and the back shells folded over the outer edges of the leather to hold the same in place, substantially as shown and described.

WILLIAM LE B. HAWES.

Witnesses:
EDWARDS RITCHIE,
H. C. BEDINGER.